(12) United States Patent
Plickys

(10) Patent No.: US 9,742,136 B2
(45) Date of Patent: Aug. 22, 2017

(54) PROPELLER DEICING BRUSH BLOCK

(71) Applicant: HAMILTON SUNDSTRAND CORPORATION, Windsor Locks, CT (US)

(72) Inventor: Mark R. Plickys, Unionville, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 414 days.

(21) Appl. No.: 14/450,847

(22) Filed: Aug. 4, 2014

(65) Prior Publication Data

US 2016/0036183 A1    Feb. 4, 2016

(51) Int. Cl.
| | |
|---|---|
| H01R 39/41 | (2006.01) |
| H01R 39/38 | (2006.01) |
| H01R 43/12 | (2006.01) |
| B64D 15/12 | (2006.01) |
| H01R 39/34 | (2006.01) |
| H01R 43/24 | (2006.01) |

(52) U.S. Cl.
CPC ......... *H01R 39/41* (2013.01); *H01R 39/381* (2013.01); *H01R 39/383* (2013.01); *H01R 43/12* (2013.01); *B64D 15/12* (2013.01); *H01R 39/34* (2013.01); *H01R 39/388* (2013.01); *H01R 43/24* (2013.01)

(58) Field of Classification Search
CPC ...... H01R 39/085; H01R 39/08; H01R 39/00; H01R 39/24; H01R 39/18; H01R 39/36; H01R 39/383; H01R 39/386; H01R 39/39; H01R 39/40; H01R 39/41; H01R 39/381; H01R 39/388; H01R 43/24; H01R 43/12; B64D 15/12; B64D 15/00; B64D 15/14; B64D 15/20; B64D 15/22; B64D 15/16

See application file for complete search history.

(56) References Cited

U.S. PATENT DOCUMENTS

| | | |
|---|---|---|
| 3,387,155 A | 6/1968 | Krulls |
| 3,644,703 A | 2/1972 | Nelson |
| 3,657,514 A | 4/1972 | Adams |

(Continued)

FOREIGN PATENT DOCUMENTS

FR    3000853 A1    7/2014

OTHER PUBLICATIONS

Extended European Search Report for EP Application No. 15170514.2-1801, dated Nov. 5, 2015, pp. 1-7.

*Primary Examiner* — Shawntina Fuqua
(74) *Attorney, Agent, or Firm* — Cantor Colburn LLP

(57) ABSTRACT

A brush block assembly and a method of assembling the same are described. The brush block assembly includes two or more brushes arranged in one or more rows, each of the two or more brushes comprised of a pressed electrically conductive material with an integral lead wire and a terminal, and one or more terminal studs, each of the two or more brush blocks within a same one of the one or more rows being separated by one of the one or more terminal studs, a helical spring coupled respectively to each of the two or more brushes, and insulated wires from a power supply and the respective terminal of each of the two or more brushes within the same one of the one or more rows being retained by the one of the one or more terminal studs in the one of the one or more rows.

12 Claims, 5 Drawing Sheets

(56) References Cited

U.S. PATENT DOCUMENTS

| | | | |
|---|---|---|---|
| 4,136,295 A * | 1/1979 | Sweet | B64D 15/12 |
| | | | 244/134 D |
| 4,386,749 A | 6/1983 | Sweet et al. | |
| 4,686,405 A | 8/1987 | McKee | |
| 4,746,828 A | 5/1988 | Nado et al. | |
| 5,479,060 A * | 12/1995 | Giamati | H01R 39/085 |
| | | | 244/134 D |
| 5,509,625 A | 4/1996 | Oullette et al. | |
| 5,767,605 A | 6/1998 | Giamati | |
| 5,949,175 A | 9/1999 | Cummins | |
| 6,069,341 A | 5/2000 | Gage et al. | |
| 2003/0178908 A1 * | 9/2003 | Hirano | H01R 39/38 |
| | | | 310/239 |
| 2010/0045136 A1 | 2/2010 | Lau et al. | |

* cited by examiner

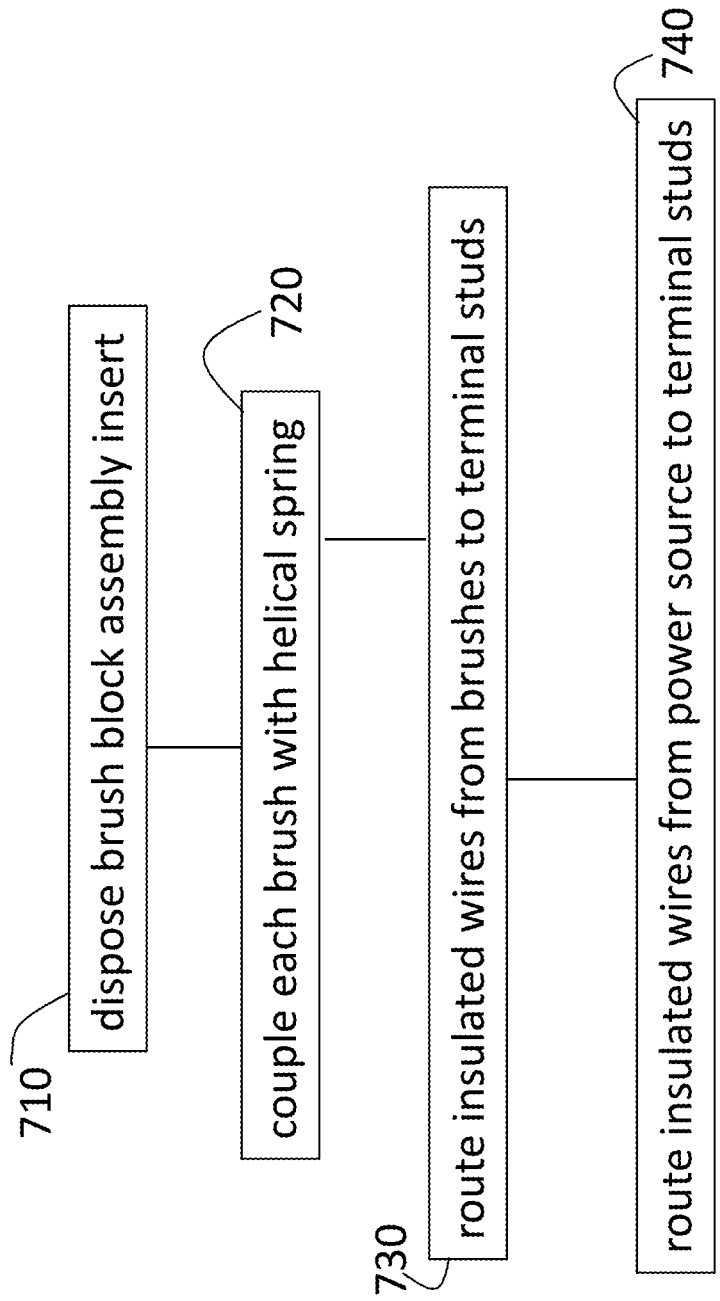

PROPELLER DEICING BRUSH BLOCK

STATEMENT OF FEDERAL SUPPORT

This invention was made with Government support under contract number N00019-08-G-0002-XT26 awarded by the Navy. The Government has certain rights in the invention.

BACKGROUND OF THE INVENTION

Exemplary embodiments pertain to the art of propeller deicing.

Propeller deicing systems prevent ice build-up on aircraft propeller blades. Generally, the systems include a resistive heating element applied to one or more sections of the propeller blade. When current is applied to the heating element, the bond between the ice and the blade surface is weakened, thereby allowing ice to be thrown off by the centrifugal force resulting from rotation of the blades. The current to the heating element is supplied by a power source located on the non-rotating side of the propeller. Thus, to supply the current to the heating elements on the rotating blades, a rotating interface is used.

BRIEF DESCRIPTION OF THE INVENTION

Disclosed is a brush block assembly of a propeller deicing system including two or more brushes arranged in one or more rows, each of the two or more brushes comprised of a pressed electrically conductive material with an integral lead wire and a terminal; one or more terminal studs, each of the two or more brushes within a same one of the one or more rows being separated by one of the one or more terminal studs; a helical spring coupled respectively to each of the two or more brushes; and insulated wires from a power supply and the respective terminal of each of the two or more brushes within the same one of the one or more rows being retained by the one of the one or more terminal studs in the one of the one or more rows.

Also disclosed is a method of assembling a brush block assembly of a propeller deicing system including disposing an insert with two or more brush pockets to house respective two or more brushes, each of the two or more brushes comprised of a pressed electrically material with an integral lead wire and a terminal; coupling each of the two or more brushes with a respective helical spring; and routing insulated wires from the respective terminal of each of the two or more brushes to one or more terminal studs, the insulated wires supplying power to the two or more brushes.

BRIEF DESCRIPTION OF THE DRAWINGS

The following descriptions should not be considered limiting in any way. With reference to the accompanying drawings, like elements are numbered alike:

FIG. 7 is a process flow of a method of fabricating a brush block assembly according to an embodiment of the invention.

DETAILED DESCRIPTION OF THE INVENTION

A detailed description of one or more embodiments of the disclosed apparatus and method are presented herein by way of exemplification and not limitation with reference to the Figures.

As noted above, a rotating interface is needed to supply current to the heating elements that deice the propeller blades. The rotating interface includes stationary electrically conductive brushes in electrical contact with associated electrically conductive slip rings mounted to the rear of the rotating propeller's spinner assembly. Each brush is generally comprised of pressed electrically conductive material with an integral lead wire and terminal. The brushes are each mounted in a brush pocket (chamber) formed within a brush block housing assembly. The pockets or chambers are arranged to position the brushes to provide mechanical contact between a contact end of the brush body's longitudinal axis and the associated slip ring surface. Each brush is spring loaded to force contact with the slip ring surface. A coil spring is typically used and is locked in place with its axial length perpendicular to the direction of the force being applied to keep the brush in contact with the slip ring. The opposite (distal) end of each brush is electrically connected to the power source. Distribution of power from the source to each brush is through a buss bar (also bus bar or bussbar). A buss bar in this particular application is typically a strip or bar of copper (although brass or aluminum may be used) that conducts electricity. Current brushes that use buss bars and coil springs are susceptible to arcing damage due to internal contamination from brush wear debris and oil ingestion. Embodiments of the brushes and method of arranging a brush block assembly detailed here relate to preventing arcing and the resulting pre-mature failure of the brush block.

Figure 2:
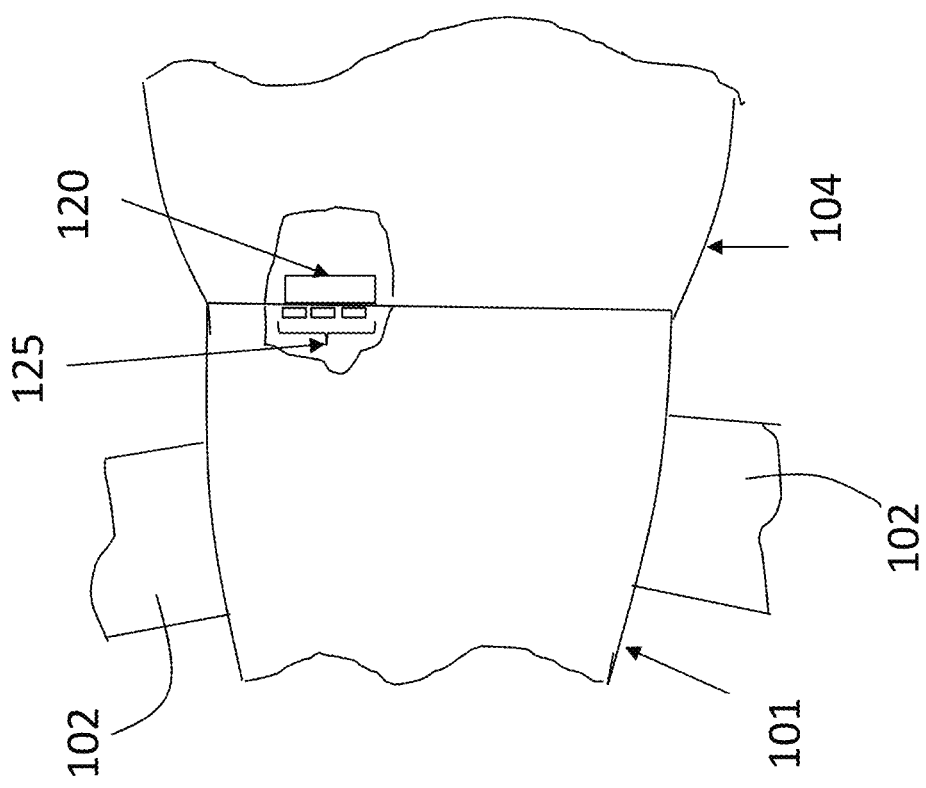
FIG. 2 shows a perspective side view of the propeller portion shown in FIG. 1.
Figure 1:
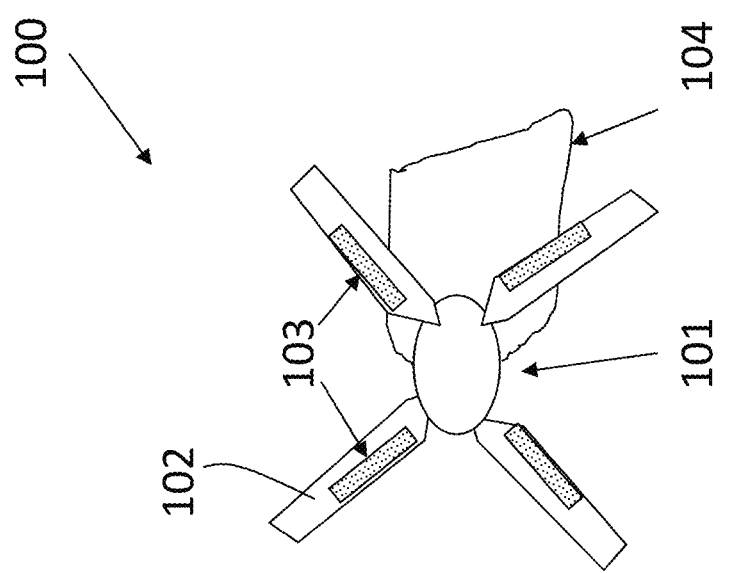
FIG. 1 depicts a propeller portion of an aircraft according to an embodiment of the invention.

FIG. 1 depicts a propeller portion 100 of an aircraft according to an embodiment of the invention. Blades 102 are arranged radially on the spinner assembly 101. According to the embodiment shown in FIG. 1, four blades 102 are arranged at ninety degree intervals and each blade 102 has a resistive heating element 103 adhered to the leading edge of each blade 102. In alternate embodiments, the heating elements 103 may be arranged differently on the blades 102. A portion of the engine cowling 104 is shown coupled to the spinner assembly 101. The engine cowling 104 is stationary during rotation of the spinner assembly 101. FIG. 2 shows a perspective side view of the propeller portion 100 shown in FIG. 1. Portions of two of the blades 102 are shown extending from the spinner assembly 101.

FIG. 2 includes a partial reveal showing a brush block assembly 120 according to an embodiment of the invention. As shown, the brush block assembly 120, which remains stationary, is coupled to slip rings 125, which are arranged within the spinner assembly 101. The configuration of the brush block assembly 120 according to embodiments to address arcing is discussed below.

Figure 3:
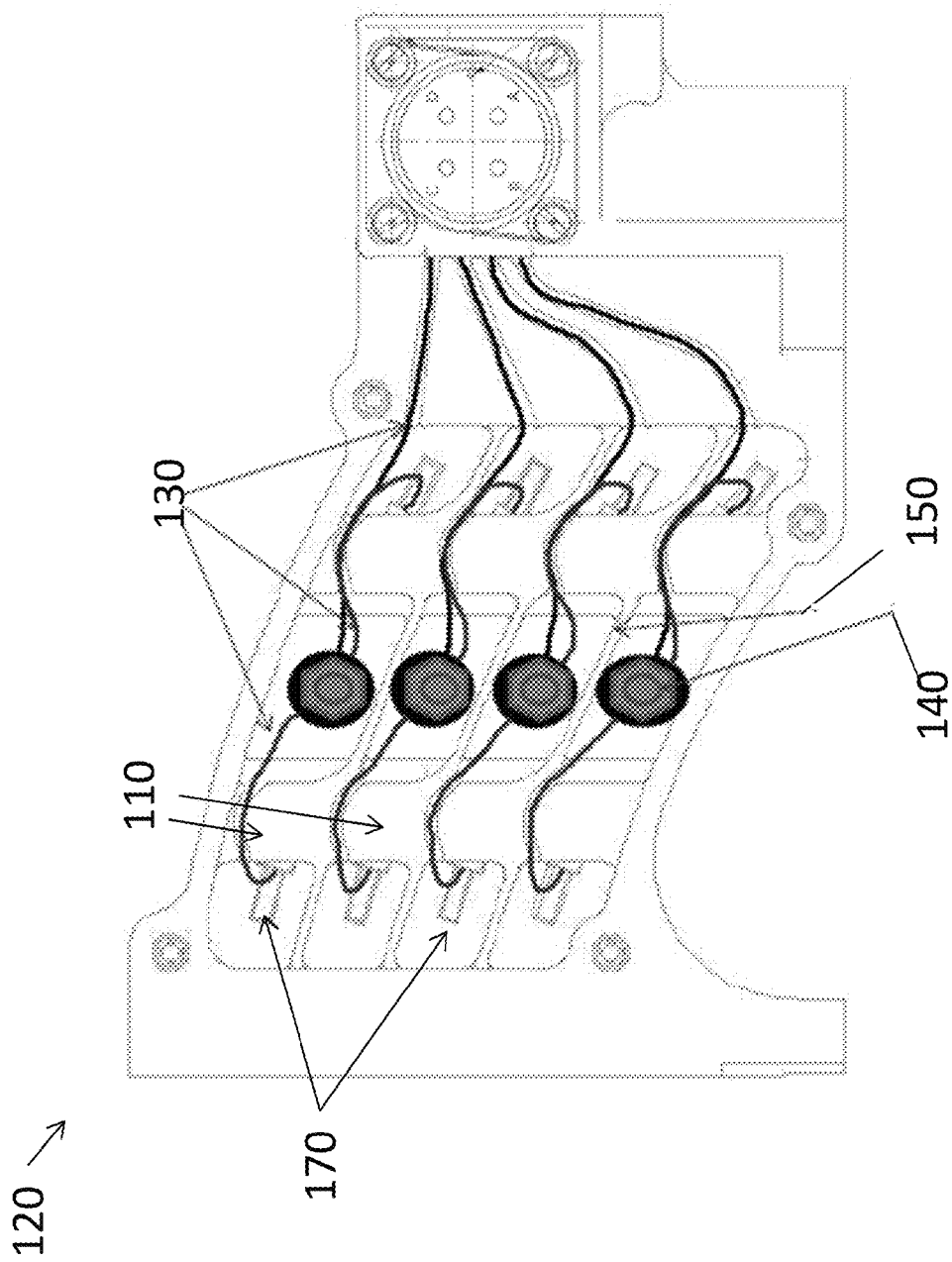
FIG. 3 depicts aspects of a brush block assembly according to an embodiment of the invention.

FIG. 3 depicts aspects of a brush block assembly 120 according to an embodiment of the invention. Eight covered brushes 110 (as shown in FIG. 3, the brushes 110 are behind the molded cover) are indicated in the exemplary brush block assembly 120 shown in FIG. 3. Instead of a bare copper buss bar, insulated wires 130 are used to supply power to the brushes 110. The insulated wires 130 from the power source and to each of the brushes 110 are secured by terminal studs 140. The metal of the terminal studs 140 is surrounded by molded separator walls 150, further detailed with reference to FIG. 4. Each of the brushes 110 is coupled to a helical spring 160 (FIG. 5) to force the brushes 110 into contact with the corresponding slip ring 125. As the discussion with reference to FIG. 5 further details, because of the relative arrangement of the helical spring 160 and the brush 110, the insulated wire 130 couples to the brush 110 from a side. The housing guides 170 that facilitate routing of the insulated wires 130 for connection to the brushes 110 (terminals of the brushes) also prevent connection of adjacent brushes 110 due to contamination.

Figure 4:
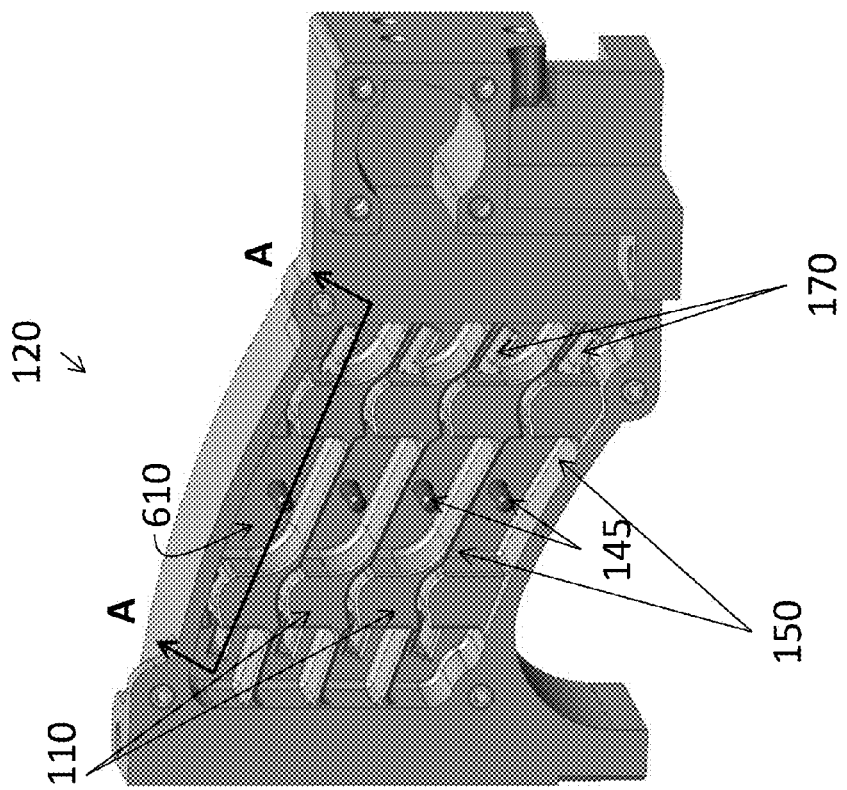
FIG. 4 depicts other aspects of the brush block assembly according to an embodiment of the invention.

FIG. 4 depicts other aspects of the brush block assembly 120 according to an embodiment of the invention. FIG. 4 shows molding 145 over the terminal studs 140 and molded separator walls 150 that isolate the terminal studs 140 from the brushes 110 and each other. Again, the brushes 110 are behind the molded wall visible in FIG. 4. The insert 610 (further detailed in FIG. 6) includes the housing guides 170 for routing the side exit insulated wires 130 of the brushes 110. As FIG. 4 illustrates, every brush 110 is isolated from every other brush 110 of the brush block assembly 120, as well as from the terminal studs 140, by non-conducting molded walls. This isolation contributes to prevention of arcing within embodiments of the brush block assembly 120 discussed herein.

Figure 5:
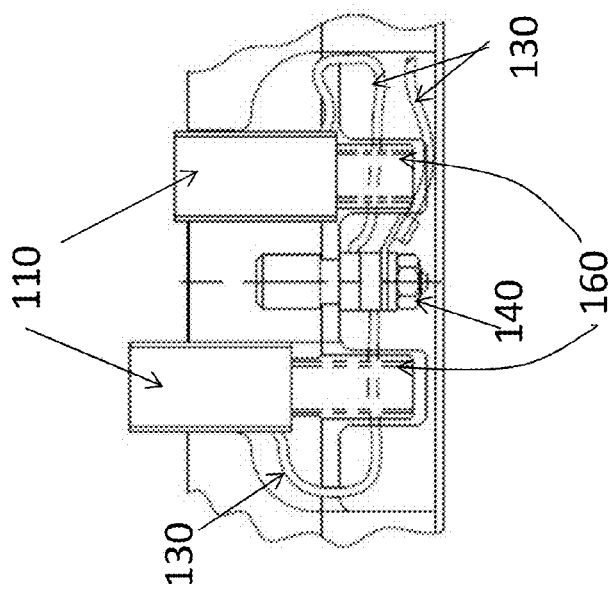
FIG. 5 depicts a cross-section view of the brush block assembly along A-A shown in FIG. 4.

FIG. 5 depicts a cross-section view of the brush block assembly 120 along A-A shown in FIG. 4. Two brushes 110 and the terminal stud 140 separating them are shown. The brushes 110 may be fabricated from carbon graphite material, for example. Each brush 110 is coupled to a helical spring 160 arranged to apply force toward the corresponding slip ring 125 (FIG. 2). Each helical spring 160 is a compression spring that is arranged with its axial length aligned with the axial length of the corresponding brush 110. This arrangement differs from the arrangement currently used for coil springs in brush block assemblies, where the coil springs are held in place with their axial length perpendicular to the axial length of the corresponding brush 110 (the direction of force). The helical springs 160 shown in FIG. 5 are separated from each other and from the terminal stud 140 by the molded separator walls 150 (FIG. 4). Thus, arcing between the helical springs 160 is prevented. The use of the insulated wires 130 rather than a bare copper buss bar, for example, further prevents arcing.

Figure 6:
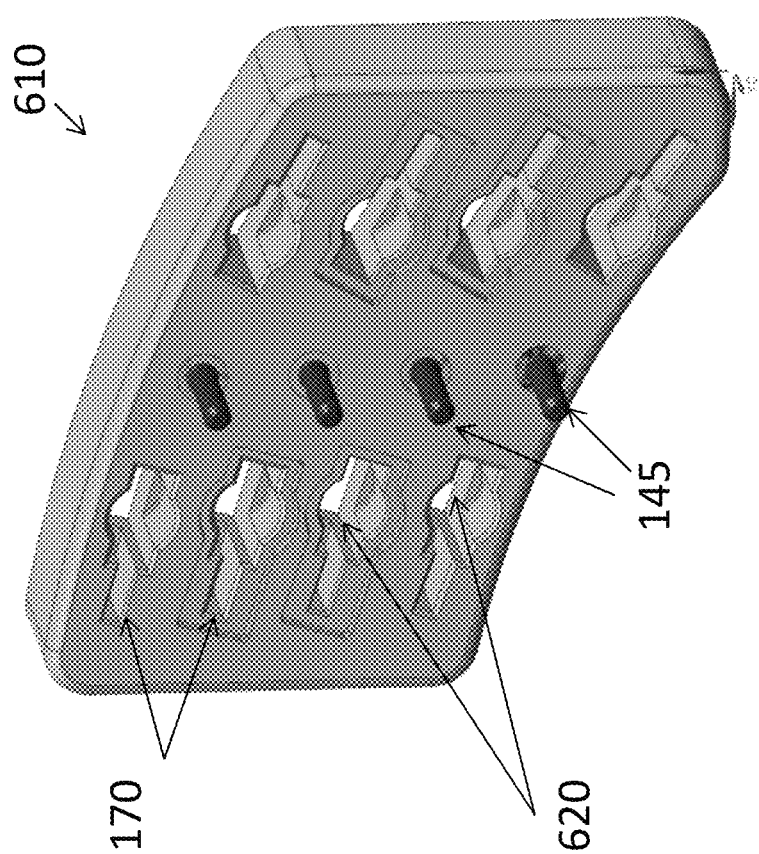
FIG. 6 depicts an insert in the brush block assembly according to an embodiment of the invention.

FIG. 6 depicts an insert 610 in the brush block assembly 120 according to an embodiment of the invention. The insert 610 may be composed of a polyetheretherketone (PEEK) thermoplastic resin, for example. The insert 610 shown in FIG. 6 includes eight brush chambers or pockets 620 corresponding with the eight brushes 110 indicated in FIGS. 3 and 4. FIG. 6 illustrates the isolation of each brush 110 within a (PEEK) pocket 620. The housing guides 170, which facilitate guiding insulated wires 130 to each of the brushes 110, are also shown. These housing guides 170 are on the outside of the insert 610 (on the side of the corresponding brush 110 that is away from the adjacent brush 110) to further prevent arcing between brushes 110.

FIG. 7 is a process flow of a method of assembling a brush block assembly 120 according to an embodiment of the invention. At block 710, disposing the brush block assembly insert 610 may include obtaining or forming a PEEK thermoplastic resin, for example, to include the pockets 620, housing guides 170, and molding 145 to cover the terminal studs 140 as shown in FIG. 6. Coupling each brush 110 with a helical spring 160, at block 720, includes achieving a relative arrangement as shown in FIG. 5. That is, the axial length of the compression helical spring 160 is along the direction of force applied to the brush 110 to maintain contact between the brush 110 and corresponding slip ring 125. At block 730, routing the insulated wires 130 from the brushes 110 (terminal of the brushes 110) to the terminal studs 140 is via the housing guides 170, as shown in FIG. 3, for example. Routing insulated wires from the power source to the terminal studs 140 facilitates power supply to the brushes 110. As discussed above, the particular configuration according to the embodiment discussed herein, which includes the way that the helical springs 160 are arranged and the use and arrangement of the insulated wires 130, prevents arcing between adjacent brushes 110.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A brush block assembly of a propeller deicing system, comprising:
   two or more brushes arranged in one or more rows, each of the two or more brushes comprised of a pressed electrically conductive material with an integral lead wire and a terminal;
   one or more terminal studs, each of the two or more brushes within a same one of the one or more rows being separated from an adjacent one of the two or more brushes by one of the one or more terminal studs;
   a helical spring coupled respectively to each of the two or more brushes; and
   insulated wires from a power supply and the respective terminal of each of the two or more brushes within the same one of the one or more rows being retained by the one of the one or more terminal studs in the one of the one or more rows, wherein the insulated wires couple to the terminal of a respective one of the two or more brushes at a side opposite a side adjacent to the adjacent one of the two or more brushes.

2. The assembly according to claim 1, further comprising non-conductive molded walls surrounding each of the one or more terminal studs and separating each of the one or more terminal studs from the two or more brushes with the same one of the one or more rows.

3. The assembly according to claim 1, further comprising an insert to house each of the two or more brushes.

4. The assembly according to claim 3, wherein the insert comprises pockets and wire guides extending from the pockets, each of the pockets housing a respective one of the two or more brushes, and each of the wire guides routing one of the insulated wires from the terminal of a respective one of the two or more brushes to an external surface of the brush block assembly.

5. The assembly according to claim 4, wherein each of the wire guides routes one of the insulated wires from the terminal of the respective one of the two or more brushes to an outer edge of the insert, away from an adjacent one of the two or more brushes.

6. The assembly according to claim 3, wherein the insert is formed from a polyetheretherketone (PEEK) thermoplastic resin and electrically isolates each of the two or more brushes from each other.

7. The assembly according to claim 1, wherein an axial length of each helical spring being along a direction of force applied to the respective one of the two or more brushes to maintain contact between the one of the two or more brush blocks and a respective slip ring.

8. A method of assembling a brush block assembly of a propeller deicing system, the method comprising:
disposing an insert with two or more brush pockets to house respective two or more brushes, each of the two or more brushes including a pressed electrically conductive material with an integral lead wire and a terminal;
coupling each of the two or more brushes with a respective helical spring;
disposing one or more terminal studs between adjacent ones of the two or more brushes; and
routing insulated wires from the respective terminal of each of the two or more brushes to the one or more terminal studs such that the insulated wires couple to the terminal of a respective one of the two or more brushes at a side opposite a side adjacent to the adjacent one of the two or more brushes, the insulated wires supplying power to the two or more brushes.

9. The method according to claim 8, further comprising routing insulated power supply wires from a power supply to each of the one or more terminal studs.

10. The method according to claim 8, further comprising arranging each of the two or more brushes in the two or more brush pockets to perform the routing the insulated wires to the one or more terminal studs through wire guides formed as cut-outs in the insert.

11. The method according to claim 9, wherein the coupling each of the two or more brushes with the respective helical spring includes arranging the respective helical spring with an axial length along a direction of force applied to the respective one of the two or more brushes to maintain contact between the one of the two or more brushes and a respective slip ring.

12. The method according to claim 8, further comprising forming a molding over the one or more terminal studs.

* * * * *